3,123,759
AUTOMATIC BATTERY CHARGER
Geoffrey H. Grey, Alhambra, Calif., assignor to Dynamics Instrumentation Company, Monterey Park, Calif., a corporation of California
Filed May 15, 1961, Ser. No. 110,233
3 Claims. (Cl. 320—40)

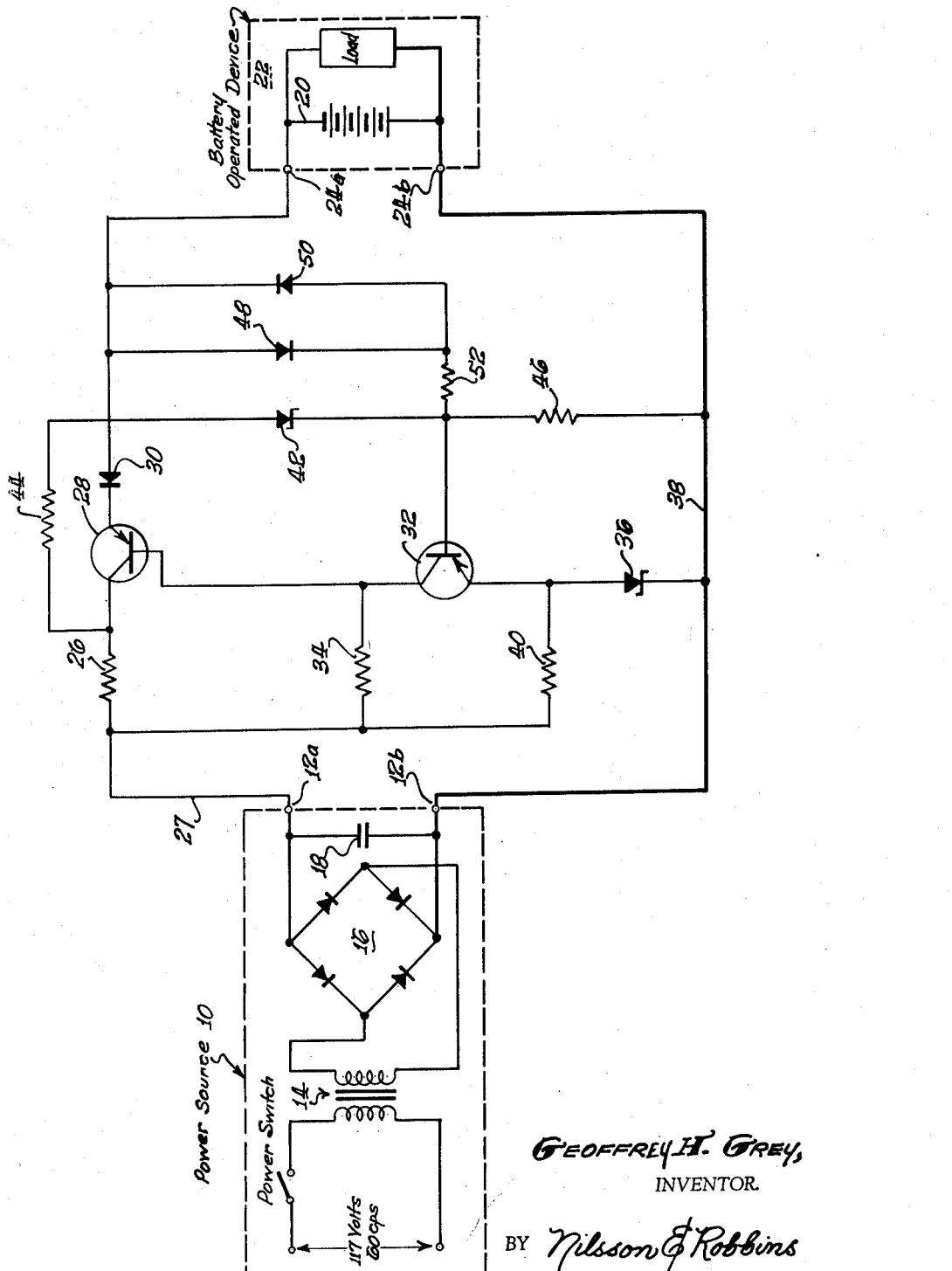

This invention relates to battery chargers, and more specifically to a method and system for automatically recharging a battery when it reaches a certain state of discharge.

Battery operation for many types of electrical and electronic equipment and devices has become increasingly desirable with the advent of conveniently portable, compact equipment in many fields. Batteries, themselves, have been developed which are readily portable and thus provide the possibility of operation of such equipment independently of public utility lines and their noise and fluctuations. With the development of more precise and lower level measuring instruments, it has become particularly useful to utilize batteries as accurate, noise-free power supplies for them.

Battery operation has also become even more practical and economical with the development of rechargeable, lightweight and compact batteries such that they may be conveniently handled and inexpensively operated because of their ability to be recharged when expended or discharged.

Recharging of batteries can be done manually but the procedure is inconvenient and requires monitoring of meters and switching devices. Also, the battery may be found to be totally discharged or nearly so at a particular time when a full charge is demanded or desirable. It is therefore convenient and frequently mandatory to have automatic battery chargers.

Some prior practices in the art of automatic battery chargers are directed toward maintaining a battery to be charged at a constant potential or by injecting therein a continuous trickle of charging current. With the constant potential system, the charger is set for a desired potential at its output terminal which causes charging to the battery whenever the battery is below that potential. However, if the full battery potential is chosen as the setting for the charger, the charger will charge substantially continuously with consequent continuous gassing. Such gassing is commonly encountered in battery charging with conventional methods and is deleterious in that the gases generated are typically inflammable, corrosive and noxious. The gassing also results in undesired deposits on the electrodes and filler caps and causes undue depletion of the electrolyte.

The automatic trickle method of charging supplies a constant current to the battery of such low magnitude as not to cause gassing; but such charge rates must in general be too small to permit recharging a discharged battery in a reasonable time period. Typically, the trickle rate is no greater than one-fiftieth of the ampere-hour rating of the battery so that at least fifty hours is required to recharge a battery even if there are no load demands on it in the meantime.

It is an object of the present invention to provide an automatic battery charger which is not subject to these and other disadvantages of the prior art systems.

It is another object to provide such a battery charger which supplies a high rate of current to the battery in a short period of time and then is shut off completely until the battery again reaches a particular state of discharge.

It is another object to provide such a battery charger which supplies charging current at a substantially constant rate during the charging period.

It is another object to provide such a charger which may recharge a fully discharged battery in one to three hours with minimum gassing.

It is another object to provide such a system which is fully transistorized and compact and lightweight.

It is another object to provide such a system which, whether energized or not, presents no load to a battery to which it may be connected.

These and other objects and advantages are achieved in accordance with the novel method and structure of the invention in which a system including a bi-stable coupling network automatically couples a charging current source to the battery when it obtains a predetermined state of discharge indicated by a particular, low, terminal potential. The coupling network continues to provide a substantially constant and relatively-large charging current to the battery until it reaches a predetermined state of charge indicated by a particular, high, terminal potential. The coupling network then ceases altogether to couple charging current to the battery until it again is discharged. The coupling network may include two transistors which alternatively conduct in response to the state of conduction of a pair of back-to-back, in a parallel sense, diodes coupled between the battery terminal and the base electrode of one of the transistors. The back-to-back diodes are chosen to have a voltage region of substantially no conduction where such region corresponds to the desired range of variation of potential of the battery between full charge and discharge. Below this range one diode conducts and causes the coupling network to deliver charge to the battery. Above this range, the other diode conducts and causes, effectively, the uncoupling of the current source from the battery. A positive latching circuit holds the coupling network in this state until the battery is discharged to the predetermined lower end of the range.

Other novel features of the structure and method will become apparent and be best understood from the following description taken in conjunction with the drawing in which the figure illustrates by way of a schematic diagram an example of the battery charger constructed in accordance with the invention.

In the figure, a power supply 10 is illustrated as including a full-wave rectifier for supplying from a 117 volt, 60 cycle source, not shown, a direct current voltage at its output terminals 12a, 12b of, for example, approximately 12 volts. The power supply 10 is shown as including a transformer 14, a full wave rectifier 16 and a filter capacitor 18. The power supply 10 is obviously an arbitrary example and may be any source of the desired direct current for charging ultimately a battery 20 which may be included within a battery operated device 22. The automatic battery charging network is shown coupled between the output terminals 12 of the power supply 10 and a set of terminals 24a, 24b of the battery operated device 22.

Particular circuit values and particular components will be included in this description for purposes of clarity of explanation of the principles of the invention and are not intended as a limitation of the scope of the invention. Obviously, a number of equivalents or other values of the circuit parameters may be utilized by one skilled in the art without departing from the intended scope of the invention. In this connection, it may be noted that the power supply 10 is a supply of approximately 12 volts negative direct current voltage and the battery 20 (to be charged, or to be recharged) is a 5 cell battery with a normal terminal potential of approximately 7 volts negative; that is, approximately 1.4 volts per cell. Obviously, different values and different cells may be employed and, for example, the polarity of all the components in the system may be systematically reversed for recharging a battery with a positive voltage source.

A current limiting resistor 26 is connected to the input terminal 27 in the example chosen for recharging the 7 volt battery from the 12 volt power supply in approximately two hours of charging time. The resistor 26 may be approximately 5 ohms in magnitude of resistance. The collector electrode of a charging transistor 28 is connected to the opposite terminal of the resistor 26. The transistor 28 may be a type 2N669 transistor. The emitter electrode of the transistor 28 is connected through a blocking diode 30 to the output terminal 24 of the charging network. The diode 30 may be a type SD91A. Its function is to preclude discharging of the battery 20 through the transistor 28 particularly when the network is not energized from a power supply.

The collector electrode of a second, control transistor 32 is connected to the input terminal 27 through a resistor 34 which may have a value of approximately 270 ohms. The transistor 32 may be a type 2N1192. Its emitter electrode is maintained at a voltage of approximately 6.6 volts negative by means of its connection to a voltage regulator diode 36 which is connected between a return bus 38 and the input terminal 27 by a resistor 40 which may have a resistance of approximately 2.7 kilohms. The voltage regulator diode 36 may be a type 1N3016 which maintains and regulates a voltage across its terminals of 6.6±2% volts and has a power rating of 1 watt.

A latching diode 42 is connected between the base electrode of transistor 32 and the collector electrode of transistor 28 through a resistor 44 which may be approximately 2 kilohms. The diode 42 may be a type 1N751. The base electrode of transistor 32 is returned to ground or the return bus through a resistor 46 which may have a resistance of approximately 6.8 kilohms. A pair of sensing diodes 48, 50 are connected in parallel, oppositely poled (that is, back-to-back, in a parallel sense) between the output terminal 24a and the base electrode of transistor 32 through a resistor 52 which may have a resistance of approximately 47 ohms. The sensing diodes may be type 1N461.

In operation, when the battery charging network is initially energized, current flows from the output terminal 12 of the power supply 10 through the current-limiting resistor 26, through transistor 28 and the blocking diode 30 to the negative terminal of the battery 20. In this "on" state, the transistor 28 is held in saturation conduction by base current which it receives through the resistor 34. In this example, the transistor 28 has a voltage drop of approximately .2 of a volt and the blocking diode 30 approximately .7 of a volt and the current limiting resistor 26 has approximately 5 volts drop. This permits fully charging a 1 ampere-hour, nickel cadmium battery, such as battery 20, in approximately 2 hours.

In this "on" state, the transistor 32 does not draw appreciable current through resistor 34 and it is substantially cut off because its emitter electrode is biased to −6.6 volts by the voltage regulator diode 36. In this state, the diodes 42, 48 and 50, in combination, have sufficient small leakage currents to hold the base electrode of the transistor 32 to approximately −6.4 volts. The voltage difference across the oppositely poled, parallel diodes is not sufficient for either of them to conduct appreciably and the transistor 32 remains cut off while transistor 28 remains in saturation conduction with a constant charging current passing therethrough.

When the cells of the battery 20 become substantially fully charged, its terminal potential becomes approximately 8 volts. At this potential, the sensing diode 50 conducts which causes the charging network to start going to an "off" state. As sensing diode 50 conducts, the transistor 32 receives enough base current to leave its cut-off condition and go into saturation conduction. This in turn, causes the transistor 32 to take (through its collector electrode) all the base current of the transistor 28 which was supplied through the resistor 34. Transistor 28 is then cut off and the battery 20 ceases to be supplied with the charging current.

When the transistor 28 ceases to conduct, the potential of its collector electrode rises (in the negative sense) and this causes the latching diode 42 to conduct through resistor 44 and supply additional latching current to the base electrode of the transistor 32. The process of cutting "off" the conduction of transistor 28 and latching "on" the conduction of transistor 32 is a regenerative one and provides a positive locking of the network in this state. This is desirable because when the battery charging current ceases to flow into the battery 20, its potential will begin to decay and the current through sensing diode 50 may become insufficient to sustain the transistor 32 in a saturated condition.

In this "off" state, the transistor 28 is cut off. The transistor 32 is saturated; and current flows through resistors 26, 44 and latching diode 42 into the base of transistor 32 to keep it saturated.

When the battery 20 discharges through its load to approximately 6 volts, the sensing diode 48 conducts and the current to the latching diode 42 no longer goes to the base electrode of the transistor 32 but is conducted to the battery through the sensing diode 48. The transistor 32 then comes out of the state of saturation and becomes cut off. The transistor 28 then again receives base current through the resistor 34, goes into saturation conduction and the battery begins receiving charging current. As charging transistor 28 saturates, its collector electrode potential decreases below the conducting potential of the latching diode 42 and the transistor 32 remains in the cut-off condition. As the potential of the battery 20 begins to increase, due to the charging current through transistor 28, the sensing diode 48 ceases to conduct. The charging network will remain in the "on" state until the terminal voltage of the battery 20 increases to approximately 8 volts and causes conduction from the sensing diode 50 which will return the network to the "off" state.

It should be noted that when the terminal voltage of the battery 20 is between its limits of a discharged 6 volts or a fully charged 8 volts, neither of the sensing diodes 48, 50 has appreciable conduction. When those limits are exceeded, however, as by excessive discharge of the battery or an attempt to overcharge the battery, one of the sensing diodes 48, 50 goes into conduction and causes a reversal of the state of conduction of the charging network.

An additional feature of the battery charging network is that whenever the system is, or has been turned off and is reenergized, the network always starts in the "on" state of conduction because the transistor 32 is normally biased to cut off by the voltage regulator diode 36 and the resistor 40. Thus, regardless of the previous use of the battery 20, it will assuredly be fully charged within approximately two hours after the charging network has been energized.

The latching circuit of diode 42 and resistor 44 performs the additional function of causing a transition to the "off" state whenever the battery is disconnected from the charger. Thus, if the battery is momentarily disconnected, the collector potential of transistor 28 increases and conduction occurs in the latching circuit causing saturation of transistor 32 and cut off of transistor 28. The charging process can then be restarted manually by turning the power switch of the power supply off and on momentarily or, of course, the circuit will turn on automatically whenever the battery voltage decays below approximately 6 volts.

Although various features and concepts of the present invention have been set forth in the foregoing illustrative embodiment, the present invention is not to be limited in accordance therewith but is to be constructed in accordance with the claims set forth below.

What is claimed is:

1. An automatic constant-current relatively fast-charge storage battery recharging system including a bi-stable coupling network having input and output terminals and adapted to be coupled thereby between a source of charging current and a battery to be recharged and being of the character to supply a substantially constant magnitude of charging current to said battery when it obtains a first predetermined state of discharge and terminal voltage during a relatively short period until said battery obtains a second predetermined condition of charge and terminal voltage, said coupling network comprising: a first transistor having base, emitter and collector electrodes, said collector electrode being coupled to said input terminal, said emitter electrode being coupled to said output terminal; a second transistor having base, emitter, and collector electrodes, the collector of said second transistor being coupled to the base electrode of said first transistor; a voltage regulator diode coupled between the emitter electrode of said second transistor and a return bus, said base electrode of said first transistor being resistively coupled to said input terminal, said emitter electrode of said second transistor being resistively coupled to said input terminal; a pair of diodes connected in parallel, oppositely poled relationship and coupled between the base electrode of said second transistor and said output terminal for controlling the conduction state of said second transistor in response to the potential at said output terminal.

2. An automatic battery charger comprising: a source of charging current; a bi-stable coupling network having two states of conduction for selectively coupling in one of said states said source to the battery when it obtains a first predetermined state of discharge and terminal potential for a period of time until it obtains a second predetermined state and potential; a control circuit coupled to said battery and to said coupling network for reversing the state of conduction of said bi-stable network to a second one of said states when said battery obtains either of said terminal potentials; a first transistor coupled between said input and output terminals and having a first control electrode, an isolating diode interposed between said transistor and said output terminal, a second transistor coupled to said control electrode and having a second control electrode, and a sensing means coupled between said output terminal and said second control electrode for controlling the conduction state of said second transistor responsive to predetermined upper and lower limits of potential at said output terminal.

3. The invention according to claim 2 in which said sensing means includes a pair of parallel coupled, oppositely poled diodes having conduction threshold potential substantially equal respectively to said upper and lower limits of potential.

References Cited in the file of this patent

UNITED STATES PATENTS

| | | |
|---|---|---|
| 1,804,768 | Harbecke | May 12, 1931 |
| 2,979,650 | Godshalk et al. | Apr. 11, 1961 |